(No Model.)
C. F. LINDSTRAND.
DISK HARROW.
No. 556,356. Patented Mar. 17, 1896.
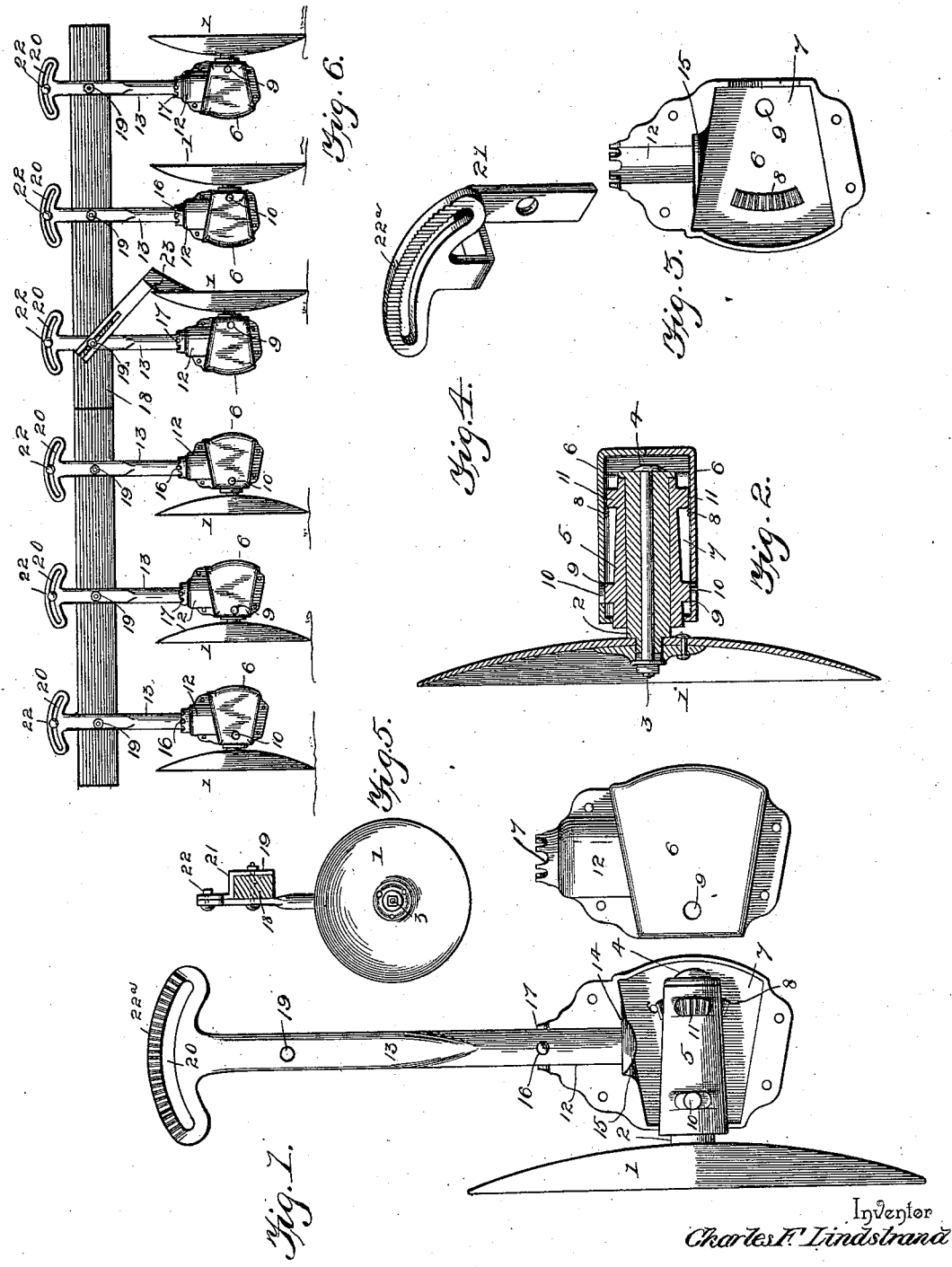
Witnesses
E. H. Monroe.
R. M. Smith
Inventor
Charles F. Lindstrand
By his Attorneys,
C. A. Snow & Co.

UNITED STATES PATENT OFFICE.

CHARLES F. LINDSTRAND, OF MOLINE, ILLINOIS.

DISK HARROW.

SPECIFICATION forming part of Letters Patent No. 556,356, dated March 17, 1896.

Application filed August 19, 1895. Serial No. 559,842. (No model.)

*To all whom it may concern:*

Be it known that I, CHARLES F. LINDSTRAND, a citizen of the United States, residing at Moline, in the county of Rock Island and State of Illinois, have invented a new and useful Disk Harrow, of which the following is a specification.

This invention relates to an improvement in disk harrows, and has for its object to provide novel and efficient means for adjusting the angles of the standards to which the rotary disks are attached and also to connect the disks with said standards and to mount the same revolubly thereon in such manner that said disks may be adjusted relatively to their standards for giving them any desired angle with respect to the ground or to the path in which the harrow travels.

Other objects and advantages of the invention will appear in the course of the subjoined description.

The invention consists in certain novel features and details of construction and arrangement of parts, as hereinafter fully described, illustrated in the drawings, and finally embodied in the claims.

In the accompanying drawings, Figure 1 is a side elevation illustrating the form of the improved standard and the box in which the bearing-sleeve of the disk is mounted, one-half of said box being detached to show the interior construction and arrangement. Fig. 2 is an inside elevation of one of the twin halves of the box in which the bearing-sleeve of one of the disks is mounted. Fig. 3 is a sectional view taken longitudinally through the bearing-sleeve of one of the disks and also through the box in which said sleeve is pivotally mounted. Fig. 4 is a detail perspective view of the segmental rack-plate which is secured to the harrow-beam. Fig. 5 is a detail vertical section through a harrow-beam, illustrating the application of the improvement thereto. Fig. 6 is a rear elevation showing the manner in which the disks and standards are applied to the harrow-beam, and showing also a scraper operating upon one of said disks.

Similar numerals of reference designate corresponding parts in the several figures of the drawings.

Referring to the accompanying drawings, 1 designates a concavo-convex harrow or cultivator disk of the usual construction, which is provided centrally with a squared opening adapted to receive the correspondingly-shaped end of a spindle 2. This spindle is provided with a central longitudinal bore which receives a headed bolt 3, passing entirely through said spindle and receiving upon the concaved surface of the disk a washer and nut. The opposite end of the spindle to that which is squared and passed through the disk is formed with a head 4, and between said head and the disk is a bearing-sleeve 5, in which the spindle 2 may freely revolve.

The box in which the bearing-sleeve 5 is mounted comprises twin halves 6, each of which is formed with a segmental recess or depression 7, and upon the inner adjacent faces of the opposite side walls of these twin halves are formed two oppositely-disposed series of teeth 8, constructed on the arc of a circle of which the transversely-aligned perforations 9 are the center. These perforations 9 are arranged near the disk end of the box and are intended to form bearings for oppositely-projecting trunnions 10 on the bearing-sleeve 5, thus adapting said bearing-sleeve to have a swinging movement within the box, thus providing for the adjustment of the angle or cant of the disk relatively to a vertical line. The bearing-sleeve is also formed with opposite projections 11 near its outer swinging end, said projections having their opposite outer faces toothed or serrated to engage with the teeth 8 upon the inner adjacent surfaces of the side walls of the box. In this manner the bearing-sleeve 5 is held at any desired adjustment and prevented from accidental movement relatively to the box in which it is pivotally mounted. The box-halves are provided with parallel meeting flanges perforated to receive suitable connecting-bolts, by means of which said halves are securely firmly together.

Each half 6 of the bearing-box is also formed upon its upper side with a semicylindrical vertical extension 12, which, when the halves of the box are brought together, forms one-half of a sleeve, through which passes the lower extremity of a standard or hanger 13, by means of which the disk and its bearing-box are supported beneath the harrow-beam.

This standard has at its lower extremity a head 14, which lies within an offset recess 15 within the bearing-box and is also provided with a transverse pin 16 extending through it, the opposite ends of said pin being adapted to engage with a diametrically-opposite pair of notches 17, a plurality of which are formed in the upper edge of the upwardly-projecting sleeve 12 referred to. By removing the pin 17 from the standard it will be apparent that the box in which the disk has its bearing may be turned and brought to any desired angle relatively to the path in which the machine is moving, and when at the desired angle the pin may be reinserted, thereby locking said box against further rotation.

The standard 13 is pivotally connected with the harrow-beam (indicated at 18) by means of a bolt 19 passing transversely through said beam, and said standard is projected above the upper edge of said beam, where it is expanded in width and formed with a segmental slot 20 struck on the arc of a circle of which the bolt 19 is the center. A bracket 21 having a segmental slot similar to that 20 of the standard 13 is also secured to the beam 18, preferably by means of the same bolt 19, and these segmental slots are arranged to align with each other when the standard 13 is disposed vertically. A clamping-bolt 22 passes through both of said slots and renders it possible to adjust the standard 13 to any desired angle and to firmly secure the same against accidental movement or departure from such adjustment.

The inner adjacent faces of the bracket 21 and the expanded upper end of the standard 13 are toothed or serrated, as shown at $22^a$, for further guarding against accidental movement of said standard. A scraper 23 may, if desired, be secured to the harrow-beam 18 by means of the bolt 19, and said scraper may be slotted where it strides said bolt in order to provide for regulating the position of said scraper with relation to the disk.

It will be understood that any desired number of these improved standards and boxes, &c., may be applied to a harrow-beam in the manner described, and that they may also be applied to and used in the construction of cultivators, in which case the usual angular or zigzag cultivator-beam is employed. By means of the construction described it will be seen that the harrow or cultivator disks are connected with their standards by means of what is known as a "universal joint," thus providing for the adjustment of said disks to any angle with relation either to a vertical or horizontal line. It will also be seen that said disks may be vibrated through the medium of the pivoted standards 13 in such manner as to regulate the distance between the disks or for enabling said disks to penetrate the soil to different depths. A very simple and efficient harrow or cultivator may thus be obtained in which provision is made for adjusting the same to all required conditions.

Various changes in the form, proportion, and minor details of construction may be resorted to without departing from the spirit or sacrificing any of the advantages of this invention.

Having thus described the invention, what is claimed as new, and desired to be secured by Letters Patent, is—

1. In a disk harrow or cultivator, the combination with the machine-beam and a series of disks, of an independent standard for each disk and upon which the disk is journaled, said standard being pivoted intermediate its ends upon a bolt passing through the beam and formed with an expanded upper end projecting above the beam and provided with a segmental slot, a bracket secured to the top of said beam, and a bolt or fastening device passing through said bracket and engaging the segmental slot in said standard, substantially as and for the purpose described.

2. In a disk harrow or cultivator, the combination with a standard or hanger, of a bearing-box made in opposing twin halves each provided with a segmental recess or half-box, and a bearing-sleeve hingedly mounted within said recesses or half-boxes and adapted to receive the spindle of a rotary disk, substantially as and for the purpose specified.

3. In a disk harrow or cultivator, the combination with a disk having a central spindle, of a bearing-sleeve in which said spindle revolves, a bearing-box disposed around said bearing-sleeve and pivotally receiving the same, and a toothed projection on said bearing-sleeve engaging with a corresponding series of teeth on the inside of said bearing-box, substantially as and for the purpose described.

4. The combination with a harrow or cultivator disk having a square central aperture, of a spindle having one end formed to enter said square aperture in the disk and provided at its opposite end with a circumferential flange or head, a headed bolt passed longitudinally through said spindle and disk and having a retaining-nut thereon, and a bearing-sleeve surrounding said spindle and interposed between the disk and the head on the spindle and also having connection with the standard, substantially as and for the purpose specified.

In testimony that I claim the foregoing as my own I have hereto affixed my signature in the presence of two witnesses.

CHARLES F. LINDSTRAND.

Witnesses:
CHAS. H. POPE,
CARL W. LINDSTRAND.